UNITED STATES PATENT OFFICE.

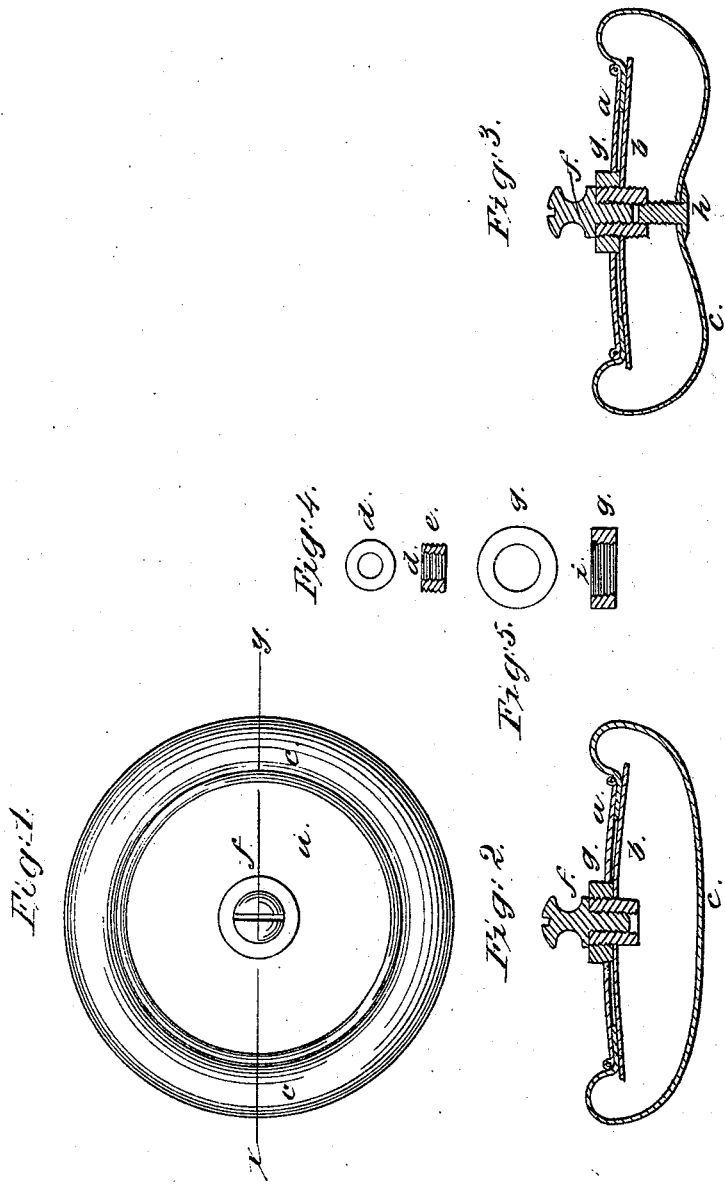

SOLOMON ANDREWS, OF PERTH AMBOY, NEW JERSEY.

IMPROVEMENT IN TRUSS-PADS.

Specification forming part of Letters Patent No. 41,749, dated March 1, 1864.

*To all whom it may concern:*

Be it known that I, SOLOMON ANDREWS, of Perth Amboy, in the county of Middlesex, in the State of New Jersey, have invented a new and useful Improvement in Truss-Pads; and I do hereby declare that the following is a full, clear, and exact description of the construction and operation of the same, reference being had to the annexed drawings, making a part of this specification, in which—

Figure 1 is a plan view of the pad; Fig. 2, a vertical section, as indicated by the line $x$ $y$ in Fig. 1, showing the convex form of the pad on the pliable portion thereof; Fig. 3, a vertical section, as indicated by the same line, showing the concave form of the pad on the pliable portion thereof; Figs. 4 and 5, views in detail, showing the inner and outer bush, respectively, detached from the disks, as hereinafter described.

Like letters indicate corresponding parts in all figures of the drawings.

The improvement in this truss-pad consists in having a pad which can be readily filled to any degree of fullness at any time and with any movable material, which will adapt itself to any shape or form of the part of the body to which it is applied, and will change itself by the motions of the body to suit the place; hence it may be strictly called a "self-adjusting truss-pad."

It is necessary that there should be one or more openings somewhere in this pad in order to introduce this movable non-elastic material for the filling. This kind of filling is of such a variety of materials that it is not possible to enumerate or name them—flax-seed, canary-seed, millet seed, hemp-seed, clover-seed, coriander-seed, glass beads, sand, soapstone in coarse powder, hollow metallic beads, rice, wheat, rye—so as to keep the pad filled to its proper dimensions, and yet adapting itself by change of position of the particles to whatever shape or form is required, so as to equalize the pressure upon all parts of the pad.

I make a truss-pad by having one side of solid material, the other pliable, the cavity within to be filled through one or more openings made for the purpose.

To enable others skilled in the art to make and use my invention, I will proceed to describe its construction and operation.

I have two disks of solid material in the pad, shown at Figs. 1, 2, and 3; but one only will answer. I think it easier and neater to secure the pliable material—for example, soft leather—for the opposite side of the pad to the solid material by screwing it between two disks. Letter $a$ shows the outer disk; $b$, the inner disk; $c$, the pliable material or soft material. Each disk is composed of two parts—viz., a disk proper and a bush. The disk proper may be made of tin and the bush of brass. The bush is secured to the center of the disk proper by soft solder.

The bush of the inner disk is shown in section, separate from the disk proper, at Fig. 4. It has a hole through it, letter $d$, which contains the thread of a female screw. The male screw that fits it serves as a stopper and to secure the pad to the spring of the truss. The outside of this bush has the thread of a male screw, letter $e$, on which is screwed the outer disk, $a$, in Figs. 1, 2, and 3. This outer disk is composed of two parts, like the inner disk—viz., a bush and a disk proper—and put together same as the inner disk. This bush $g$ is shown in section separate from the disk proper at Fig. 5. The inside of this bush has the thread of a female screw, letter $i$, which fits the male screw on the inner disk, $e$, Fig. 4, and when the two disks are screwed together, as at Figs. 1, 2, and 3, it squeezes or secures the edges of the pliable portion or soft leather of the pad between them. The edges of the pliable portion of this pad are brought over the edges of the inner disk, $b$, Figs. 1, 2, and 3, and the inner disk should be larger than the outer disk. The periphery of the inner disk being covered with the pliable portion of the pad, (leather, or other soft material,) and projecting beyond the periphery of the outer disk, will prevent chafing of the soft parts of the body.

This pad will naturally be convex or flat. To make it concave, I put a male screw having a button-shaped head, $h$, through the pliable portion of the pad into the hole in the bush of the inner disk. This screw is shown in its place in Fig. 3, letter $h$.

I claim as my invention and desire to secure by Letters Patent—

A hollow truss pad constructed as hereinbefore described, having one or more openings for the purpose of introducing the filling material, as set forth.

SOLOMON ANDREWS.

Witnesses:
GILBERT B. TOWLES,
A. THO. SMITH.